(12) United States Patent
Eberlein et al.

(10) Patent No.: US 10,505,832 B2
(45) Date of Patent: Dec. 10, 2019

(54) RESOURCE COORDINATE SYSTEM FOR DATA CENTERS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 176 days.

(21) Appl. No.: 15/591,683

(22) Filed: May 10, 2017

(65) Prior Publication Data

US 2018/0331927 A1 Nov. 15, 2018

(51) Int. Cl.
*H04L 12/26* (2006.01)
*H04L 12/24* (2006.01)

(52) U.S. Cl.
CPC .......... *H04L 43/0876* (2013.01); *H04L 41/12* (2013.01); *H04L 41/22* (2013.01); *H04L 41/065* (2013.01)

(58) Field of Classification Search
CPC ....... H04L 41/065; H04L 41/12; H04L 41/22; H04L 43/0876; H04L 41/0213; H04L 41/0853
See application file for complete search history.

(56) References Cited

U.S. PATENT DOCUMENTS

| 8,447,851 B1* | 5/2013 | Anderson | G06F 11/3006 709/223 |
| 2013/0191596 A1* | 7/2013 | Benhase | G06F 12/0802 711/118 |
| 2013/0290953 A1* | 10/2013 | Li | G06F 9/5066 718/1 |
| 2014/0068609 A1* | 3/2014 | Breitgand | G06F 9/45533 718/1 |
| 2015/0134930 A1* | 5/2015 | Huang | G06F 12/1009 711/206 |
| 2015/0169291 A1* | 6/2015 | Dube | G06F 8/20 717/101 |
| 2018/0060361 A1* | 3/2018 | Beveridge | H04L 47/70 |
| 2018/0278542 A1* | 9/2018 | Barrows | H04L 47/788 |

* cited by examiner

*Primary Examiner* — Todd L Barker
(74) *Attorney, Agent, or Firm* — Fountainhead Law Group P.C.

(57) ABSTRACT

Embodiments allow identifying unique locations, proximity, and constraints of various individualization resource units in a data center. A plurality of processes may compete for available resources (e.g., CPU, network bandwidth, memory) in a shared environment, which may be virtualized (e.g., comprising host, VM, container, application server instance resource units). A scheduling infrastructure determines individualization unit locations according to an identifier reflecting resource hierarchies. For each process, the data sending infrastructure sends location data as an ID stack to a central monitoring instance for analysis. That central monitoring instance can reference the resource location information to identify process proximity and competition for resources constraining process performance. Resource location information in the form of coordinates provided by the ID stack, offer valuable information regarding resource consumption and other information relevant for process monitoring. Embodiments may be particularly useful in diagnosing bottlenecks arising from processes sharing resource units in virtualized environments.

13 Claims, 13 Drawing Sheets

RESOURCE COORDINATE SYSTEM FOR DATA CENTERS

BACKGROUND

Unless otherwise indicated herein, the approaches described in this section are not prior art to the claims in this application and are not admitted to be prior art by inclusion in this section.

The push for cost reduction in modern data centers leads to increasing hardware utilization. Idle hardware is considered a cost problem, and mechanisms are created to minimize idle times.

However, running more processes to minimize idle hardware also implies that these processes compete for resources. This can lead to slower execution, longer runtimes, and even the abortion of processes (e.g., if no more memory can be allocated).

Virtualization layers, virtual machines (VMs), containers, and application servers are various mechanisms that are used to optimize hardware utilization. These allow "overprovisioning": VMs can be defined for certain hardware, which in sum offer more resources than the hardware that is available.

Overprovisioning succeeds most of the time, where all VMs are not encountering peak demand conditions. However where hardware limits are reached and processes are slowed down or aborted, it becomes increasingly complicated to identify the root cause of the delays. This task is made more difficult by the presence of abstraction layers of VMs, containers, and application server instances (ASIs).

SUMMARY

Embodiments offer a coordinate system allowing the identification of resources in a data center. Particular embodiments permit the determination of unique locations, proximity, and constraints of various individualization resource units, including virtualized resources. Embodiments may thus be particularly useful in diagnosing resource bottlenecks arising from processes competing for resource units in virtualized environments.

Specifically, plurality of processes may compete for available resources (e.g., CPU, network bandwidth, memory) in a shared environment, which may be virtualized (e.g., comprising host, VM, container, application server instance resource units). A scheduling infrastructure initially defines individualization resource unit locations as coordinates in the form of an identifier (which may reflect resource hierarchies). For each process, a data sending infrastructure sends location data in the form of an ID stack to a central monitoring instance for analysis of the resource situation. That central monitoring instance can reference the resource location information to identify process proximity and competition for resources constraining process performance. Resource location information in the form of coordinates provided by the ID stack, offer valuable information regarding resource consumption and other information relevant for process monitoring.

An embodiment of a computer-implemented method comprises assigning unique identifiers to each of a plurality of resources within a hierarchy of a computing environment to define location information, storing the location information, and reporting the location information to a central monitoring instance. The central monitoring instance determines from the location information, a first set of resources consumed by a first process based upon a first identifier stack comprising one or more of the unique identifiers. The central monitoring instance displays the first set of resources.

A non-transitory computer readable storage medium embodies a computer program for performing a method comprising assigning unique identifiers to each of a plurality of resources within a hierarchy of a computing environment to define location information. The method further comprises storing the location information, and reporting the location information to a central monitoring instance. The central monitoring instance determines from the location information, a first set of resources consumed by a first process based upon a first identifier stack comprising one or more of the unique identifiers. The central monitoring instance receives from a modeling infrastructure, a constraint of one resource of the first set of resources, the central monitoring instance displays the first set of resources and the constraint.

An embodiment of a computer system comprises one or more processors and a software program, executable on said computer system. The software program is configured to cause an in-memory database engine to assign unique identifiers to each of a plurality of resources within a hierarchy of a computing environment to define location information, to store the location information in an in-memory database, and to determine from the location information, a first set of resources consumed by a first process based upon a first identifier stack comprising one or more of the unique identifiers. The software program is further configured to cause an in-memory database engine to determine from the location information, a second set of resources consumed by a second process based upon a second identifier stack comprising one or more of the unique identifiers, to compare the first identifier stack with the second identifier stack to determine a proximity between the first process and the second process, and to communicate the proximity for display.

Certain embodiments further comprise the central monitoring instance receiving from a modeling infrastructure a constraint of one resource of the first set of resources, and the central monitoring instance revealing the one resource as a performance bottleneck of the first process based upon the constraint.

Some embodiments further comprise the central monitoring instance determining from the location information, a second set of resources consumed by a second process based upon a second identifier stack comprising one or more of the unique identifiers, and the central monitoring instance comparing the first identifier stack with the second identifier stack to determine a proximity between the first process and the second process.

Particular embodiments may further comprise the central monitoring instance receiving from a modeling infrastructure, a constraint of one resource identified as proximate between the first process and the second process.

Various embodiments may further comprise the central monitoring instance revealing the one resource as a performance bottleneck of the first process based upon the constraint.

According to some embodiments the computing environment comprises a virtualization computing environment, and the constraint comprises a number of virtual machines supported by a hardware central processing unit.

In particular embodiments the computing environment comprises a network topology including a switch, and the constraint comprises a bandwidth of the switch.

In various embodiments the computing environment comprises a common resource shared between the first process and the second process, and the constraint comprises a number of operations per second of the common resource.

According to certain embodiments the common resource comprises an input-output device.

In particular embodiments the common resource comprises a memory.

In some embodiments the computing environment comprises a virtualization computing environment, and the hierarchy comprises a virtual machine.

The following detailed description and accompanying drawings provide a better understanding of the nature and advantages of embodiments.

DETAILED DESCRIPTION

Described herein are methods and apparatuses implementing resource coordinate systems for data centers. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
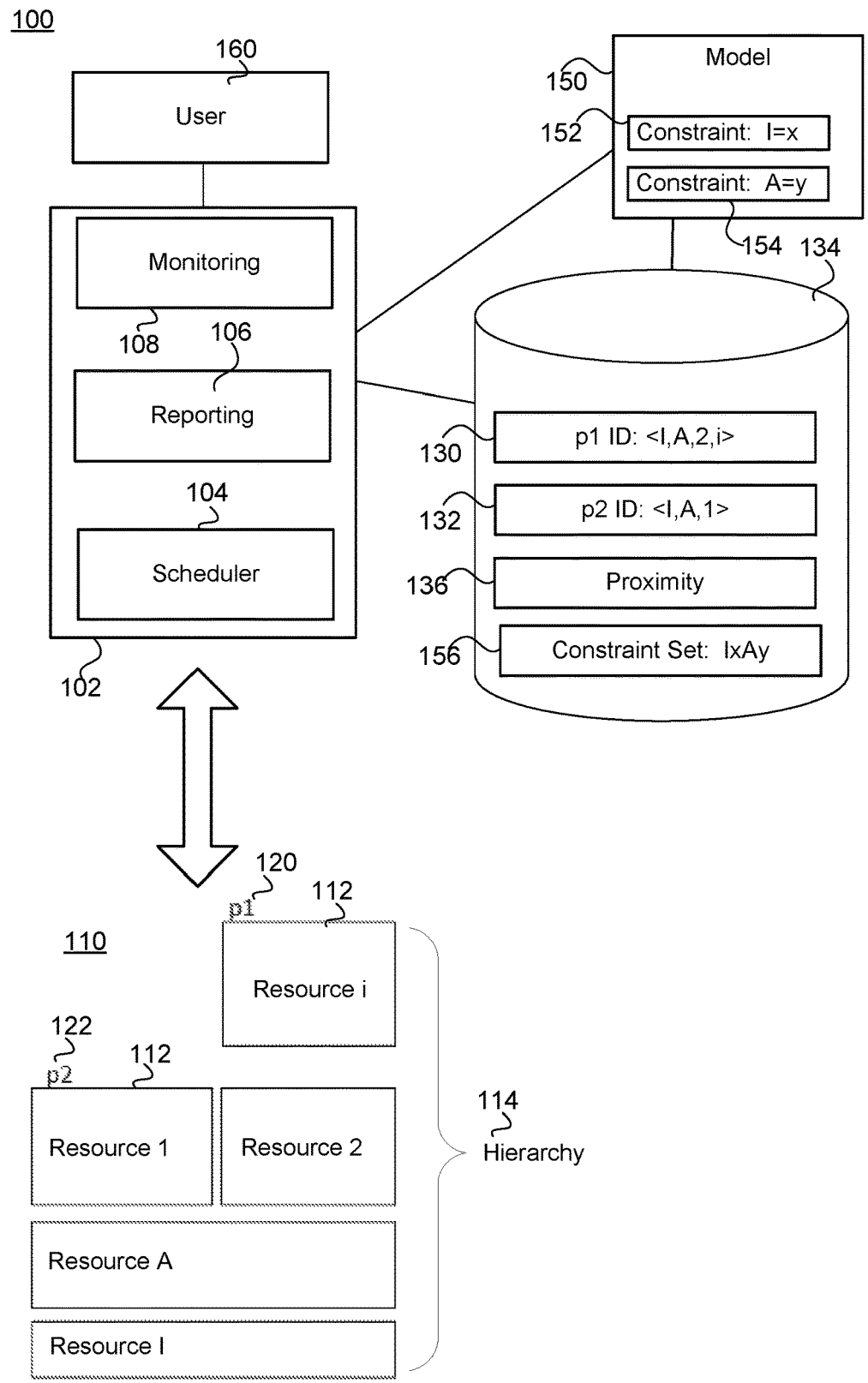
FIG. 1 shows a simplified diagram of a system according to an embodiment.

FIG. 1 shows a simplified view of a system configured to implement resource analysis according to an embodiment. Specifically, system 100 comprises engine 102 comprising a scheduler 104, reporting agent(s) 106, and central monitoring instance 108.

Engine 102 is configured to communicate with a data center 110 comprising a plurality of individualization resource units 112 that are arranged according to a resource hierarchy 114. One example of such a resource hierarchy is a virtualization environment comprising host, VMs, containers, and application server instances. Another possible example of such a resource hierarchy is a network topology comprising cards connected by switches having different bandwidths.

A first process (p1) 120 operates within the data center, consuming a set of various individualization resource units thereof, from parent (lower) to child (middle) and (grandchild) upper. A second process (p2) 122 also operates within the same data center to consume various (parent/child) individualization resource units, some of which may be shared with the first process.

Figure 2:
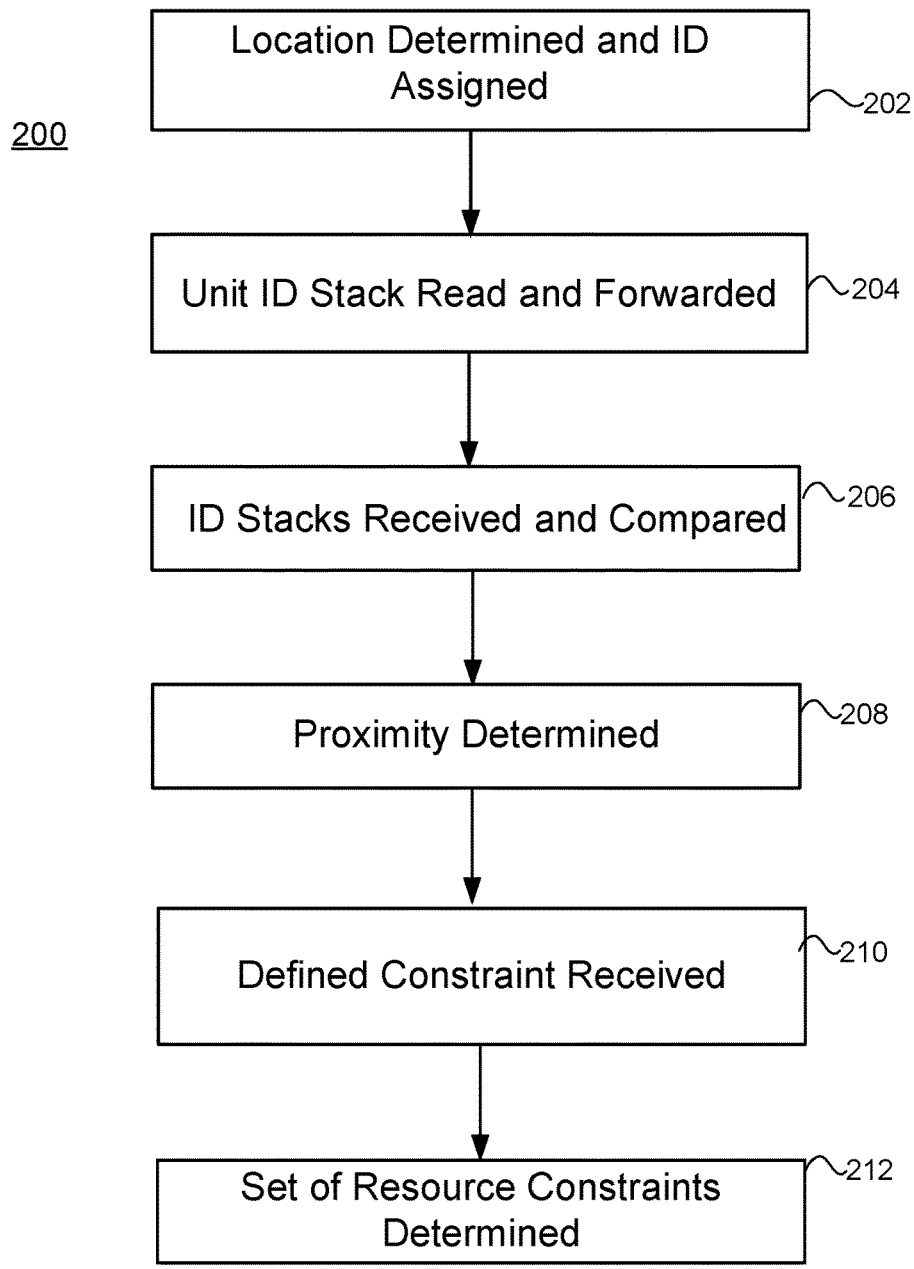
FIG. 2 shows a simplified flow diagram of a method according to an embodiment.

In order to provide an insightful analysis of resource consumption by data center processes, FIG. 2 shows a process flow of various actions that are taken by the engine. Specifically, at 202 the scheduler determines the location of each individual resource unit within the data center, assigning each unit an identifier. In this manner a resource coordinate system is created, which can be used to map processes to individualization resource units.

At 204, the reporting agent reads a respective stack of unit IDs 130, 132 from each resource unit, the stack corresponding to each process running in the data center. These unit ID stacks are then forwarded by the reporting agent to the central monitoring instance for storage in non-transitory computer-readable storage medium 134.

At 206, the central monitoring instance receives the data sets from the reporting agent(s). The monitoring instance extracts the IDs and compares them for different data sets of different processes.

At 208, where comparison of the reported stacks reveals the presence of the same identifiers, proximity 136 between processes is indicated. For example, in the simplified embodiment of FIG. 1, the ID stacks of the processes p1 and p2 reveal that they both include resource individualization units •I and •A (e.g., which in a virtualization environment may correspond to the same VM running on the same host).

At 210 a resource modeling infrastructure (e.g., 150 of FIG. 1) may define constraints 152, 154 of individual resource units. For example, the resource modeling infrastructure may define a constraint in the form of a maximum number of VM units that are able to be supported by a specific single physical CPU of the hardware. In another example, the resource modeling infrastructure may define a maximum bandwidth available to a particular switch in a network topology. This constraint information is then sent to the central monitoring instance.

At 212, the central monitoring instance receives the individual unit constraint information from the modeling infrastructure. The monitoring instance finds matching IDs of units of different processes, and reads the constraints (e.g., from child-to-parent), thus providing to a user 160 a set of constraint resources 156 for the competing processes.

Various details of implementing a coordinate system for data center resource analysis according to particular embodiments, are now discussed in connection with the following example of FIGS. 3-10.

EXAMPLE

Figure 3:
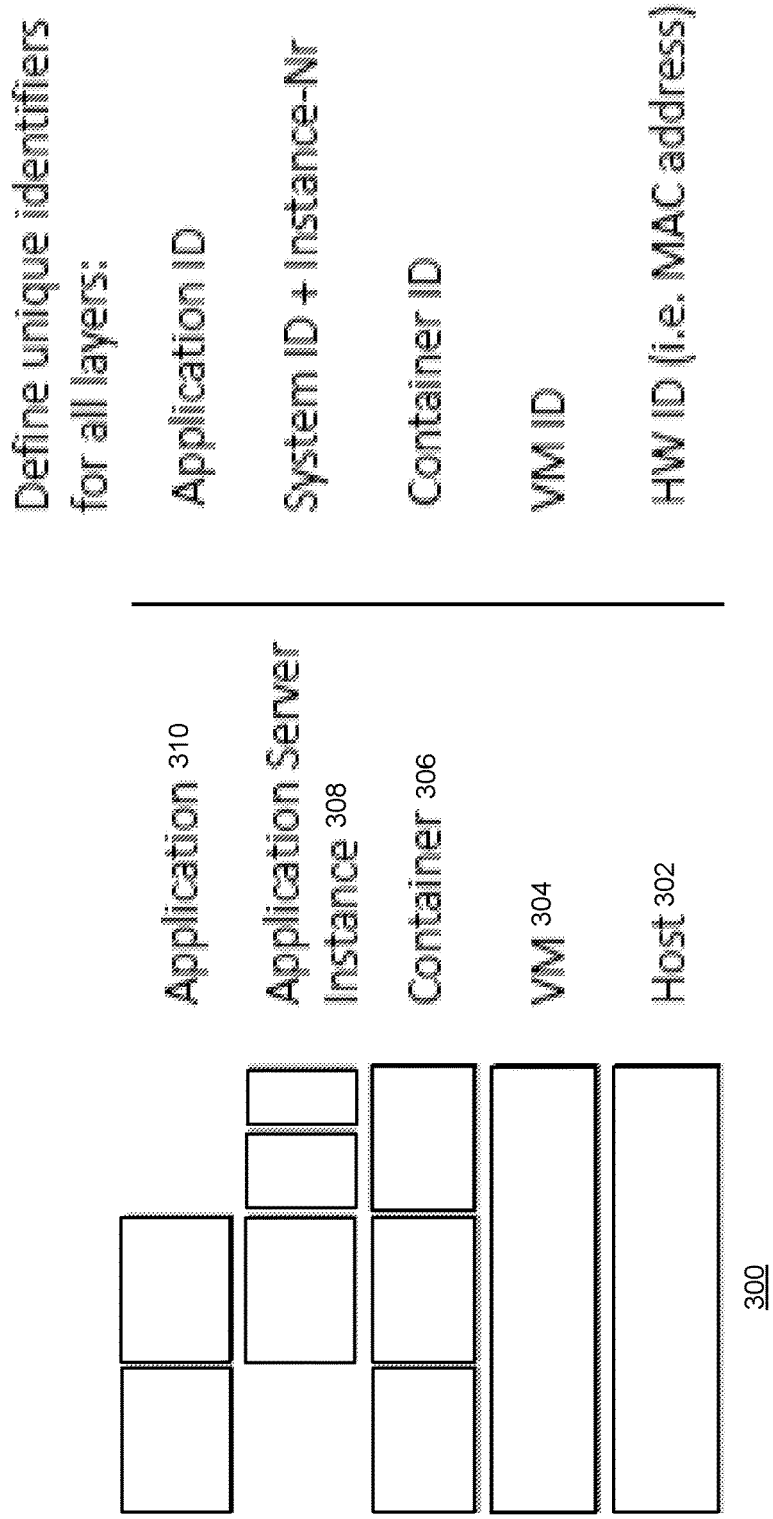
FIG. 3 shows a resource hierarchy in a virtualization environment.

FIG. 3 shows an example of a hardware environment 300 comprising a plurality of CPU resource units configured in a hierarchical manner, e.g.:

host 302;
virtual machine (VM) 304;
containers 306;
application server instances 308; and
application 310.

Monitoring data and runtime evaluation of processes deployed in that hardware environment may reveal that one or more of these processes is running slower than usual or expected. Then, a root-cause-analysis process commences in order to identify the origin of the problem.

The next level of analysis can indicate that one of the resources was constrained, and that the slowed process did not receive the expected set of resources. Application of a resource coordinate system according to embodiments may aid in identifying such a constrained resource.

As discussed previously, initially a location of each of the individualization resource units of the data center environment is determined. Here, FIG. 3 generally shows the assignment of unique IDs to the individualization units in each layer of the resource hierarchy of the virtualization environment. That unique ID provides the coordinate system serving to provide a location of the individualization resource unit within the data center environment.

Specifically, for each individualization unit, a central scheduling infrastructure (e.g. the one creating, starting and moving the unit) injects the unique ID of the underlying individualization unit. This ID is updated by the scheduling infrastructure, if the underlying individualization unit changes (e.g. a move to another unit).

Figure 4:
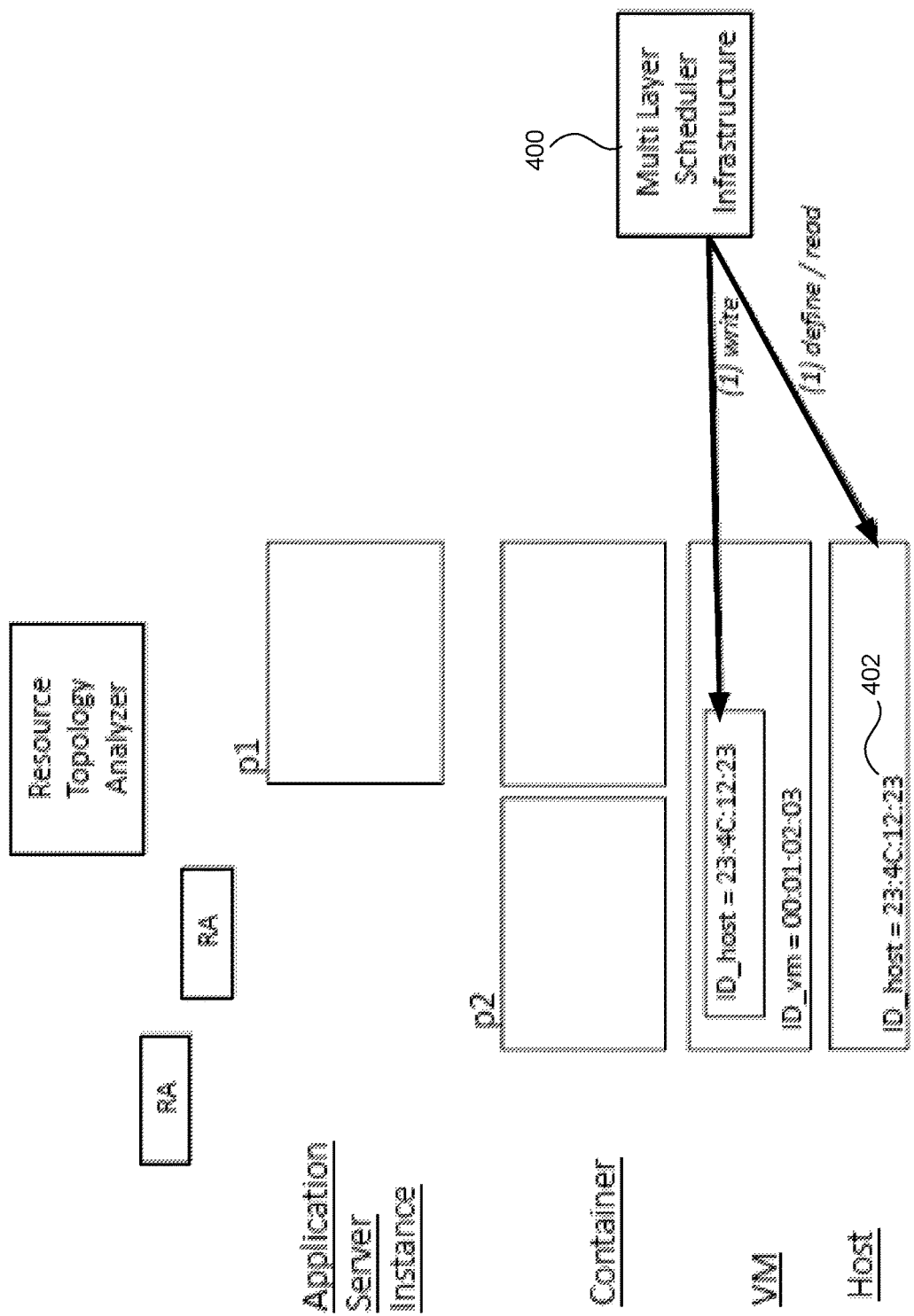
FIGS. 4-9 shows details of a process flow for resource analysis according to a specific example involving a virtualization environment.

Accordingly, FIG. 4 shows a multi-layer scheduling infrastructure (MLSI) 400 (which can be a group of scheduling infrastructures). The MLSI first assigns to each parent individualization unit (e.g., host), a unique ID 402. Here, the infrastructure comprises only a single parent (host), which is assigned the media access control (MAC) address as the unique ID.

Figure 5:
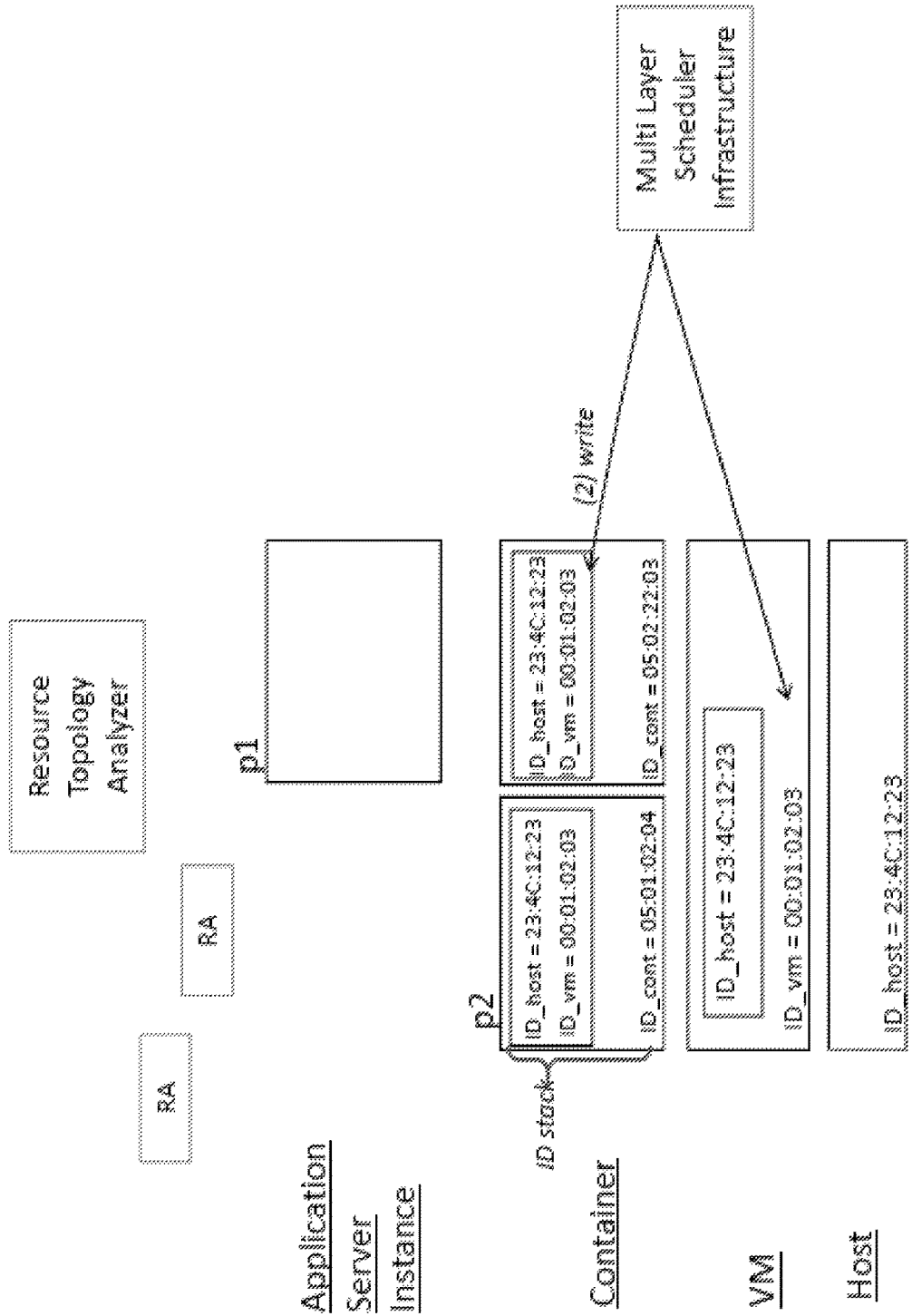

As shown in FIG. 5, the MLSI then passes the unique ID of the parent unit to the child unit contained within the parent unit, with each parent unit potentially having several child units, and each child potentially having several parent units. If the parent changes during process runtime, the MLSI passes the new parent unit ID to the child, thereby allowing the child unit to know its parent unit.

Figure 6:
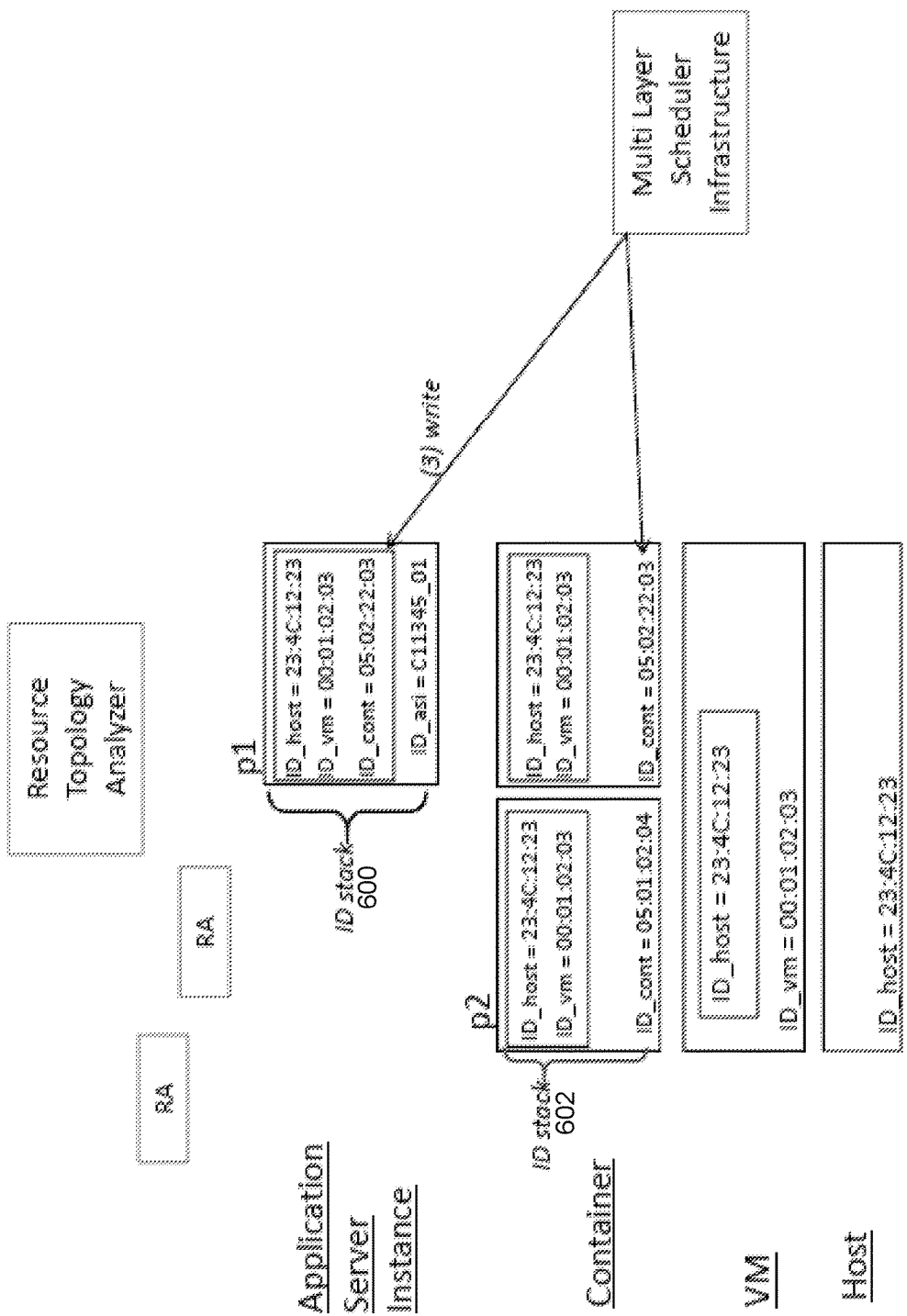

As shown in FIG. 6, the MLSI also manages parents of parents (i.e. grandparents) and children of children (i.e. grand children). The MLSI thus passes the grand parent unit IDs to a child unit, reading them from the parent unit ID store (and grand-grand parent unit IDs and so forth).

At the conclusion of the location procedure shown in FIG. 6, the specific set of resources of particular processes p1 and p2 can thus be represented by an ID stack (e.g., 600, 602). In particular, the unique ID of the host is injected into the VM, the unique ID of the VM into the container, the unique ID of the container into the app server instance. The location of the resource is then a set of IDs (ID stack) for the direct environment, the underlying environment and so on.

Figure 7:
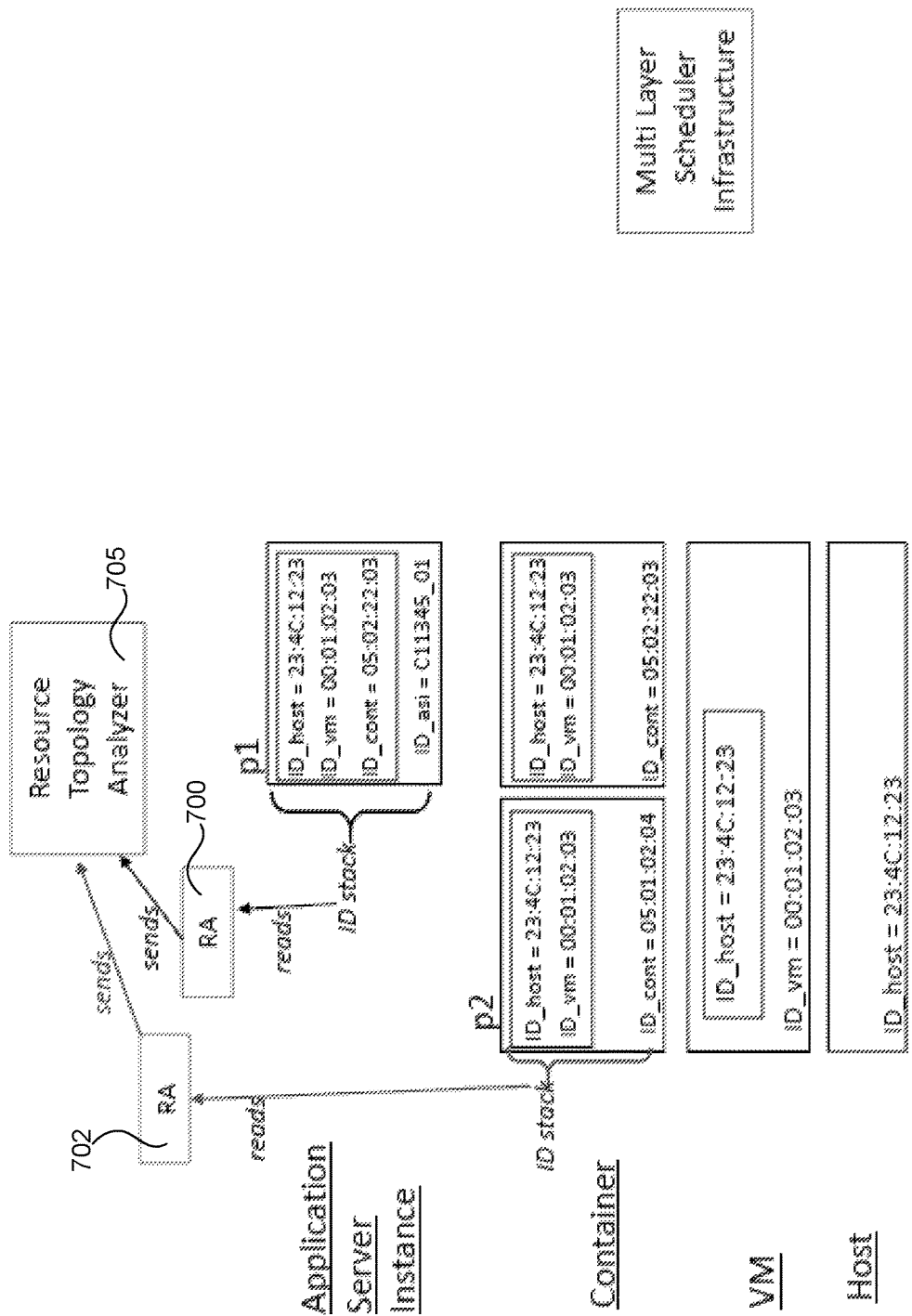

Next, FIG. 7 shows coordinate and resource consumption reporting agents (RA) 700 and 702 for the respective processes p1 and p2, reading the stack of unit IDs from the unit ID store of the current environment. The RA sends the stack of unit IDs to the resource topology analyzer RTA 704 for further processing. For each send event, the RA reads the unit IDs again in order to capture updated IDs (due, e.g., to a shifting of resources allocated to the process).

Figure 8:
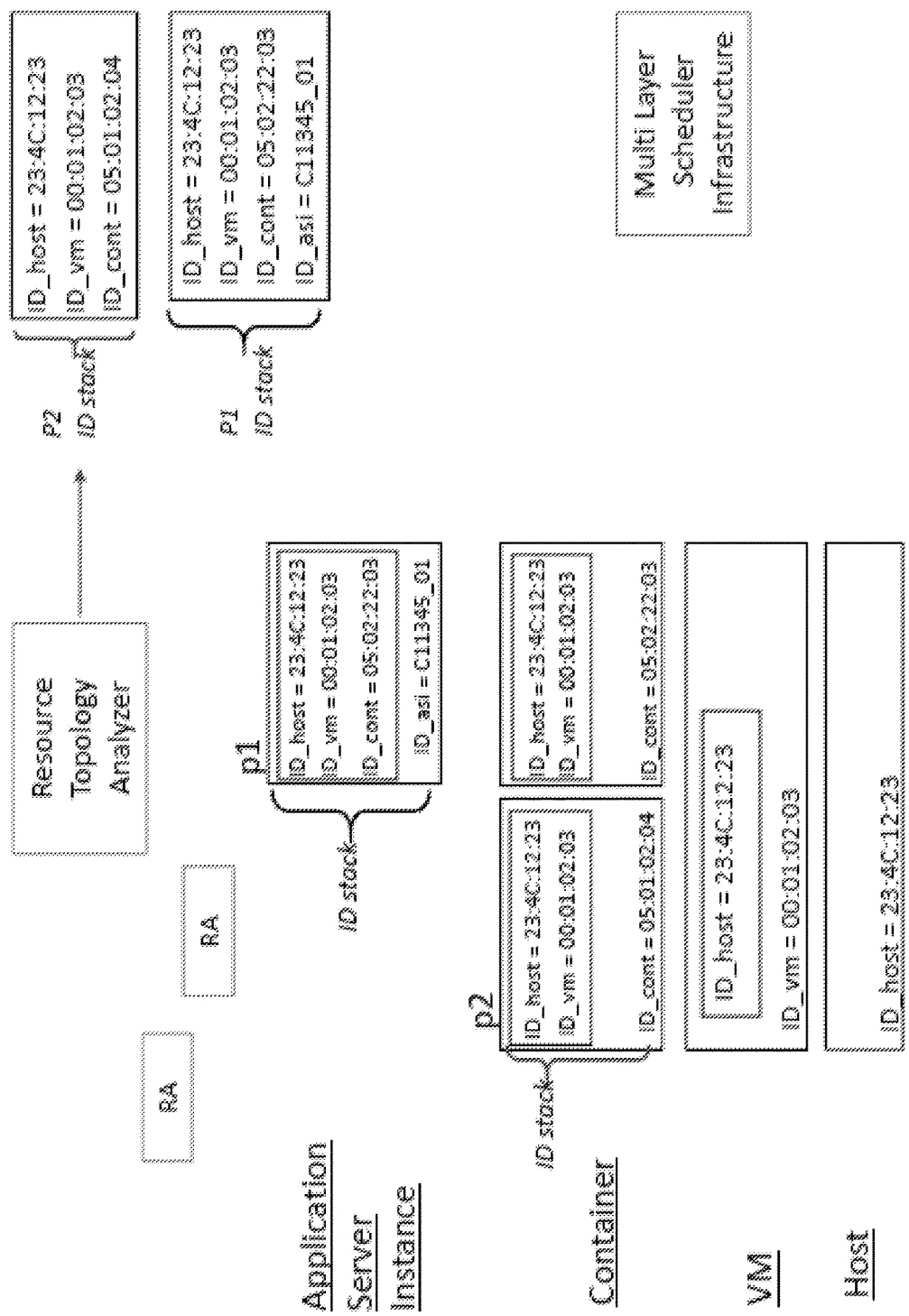

FIG. 8 shows the activity of the RTA upon receiving data sets from all connected RAs, to derive location and proximity. In particular, the RTA extracts the IDs from the data sets.

The RTA then compares the IDs from different data sets, sent by different RAs for different processes. Matching IDs resulting from this comparison identify proximity between the resources.

Proximity may be derived from resource location as follows. Here, the two processes p1 and p2 have two ID stacks:
Stack_p1 (ID1_host, ID1_vm, ID1_cont, ID1_asi)
Stack_p2 (ID2_host, ID2_vm, ID2_cont).
It is noted that not all resource layers are mandatory (e.g., the process p2 does not utilize an application service instance resource).

The two processes p1 and p2 share resource constraints, if one of the IDs in the stack match, e.g.:

ID1_host==ID2_host, indicating both processes run on the same host;

ID1_vm==ID2_vm, indicating both processes run in the same VM; and

ID1_cont≠ID2_cont, indicating the processes run in different containers.

This location-based procedure also works if the two stacks are not using the same layers. For example:

Stack_p1 (ID1_host, ID1_vm, ID1_asi)—a process running in an application server running in a VM; and Stack_p2 (ID2_host, ID2_cont)—a process running in a container.

Thus FIG. 8 shows that processes p1 and p2 share resource constraints because one of the IDs in the stack match:

ID1_host==ID2_host, indicating both processes run on the same host.

Figure 9:
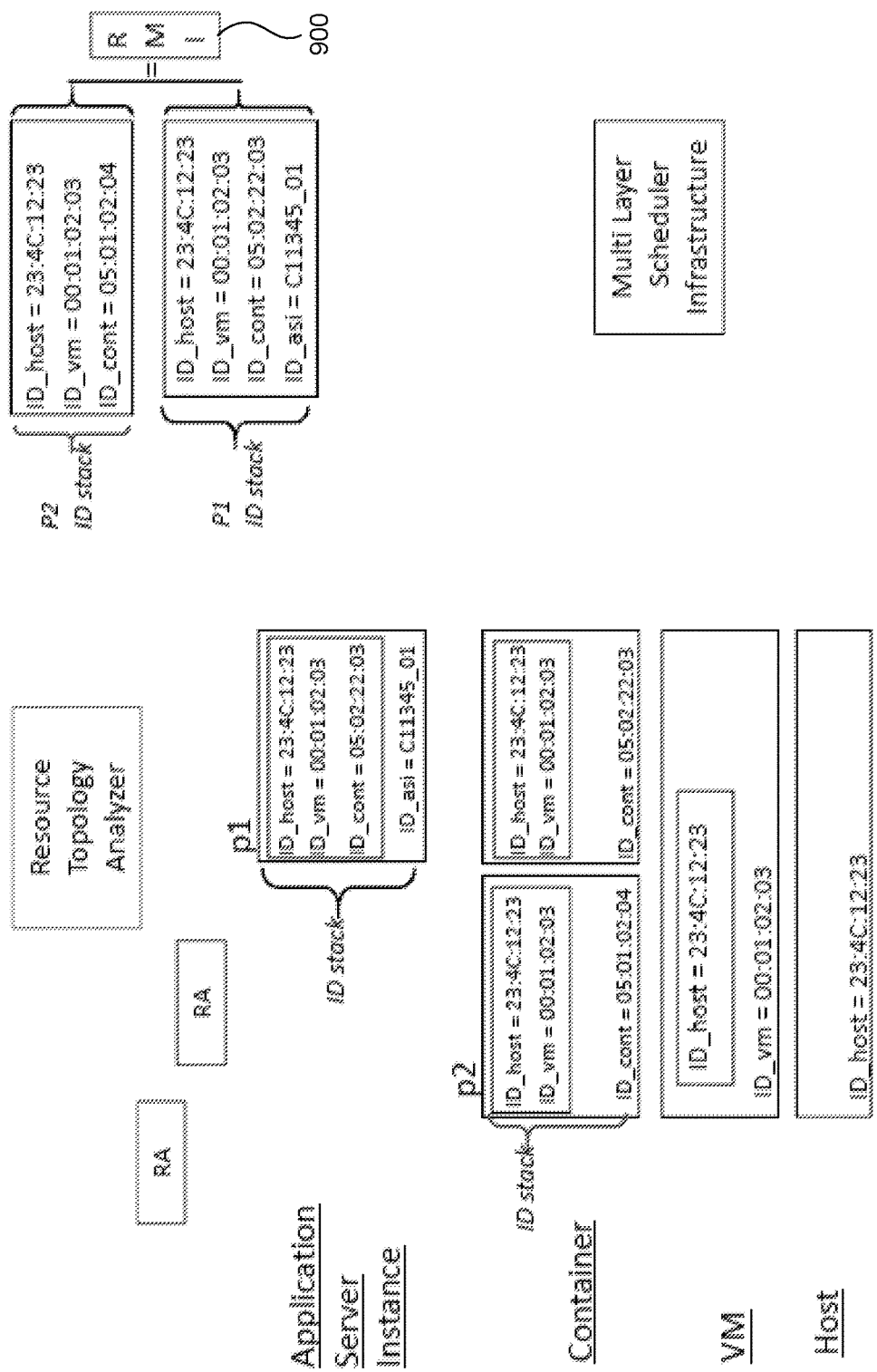
Figure 10:
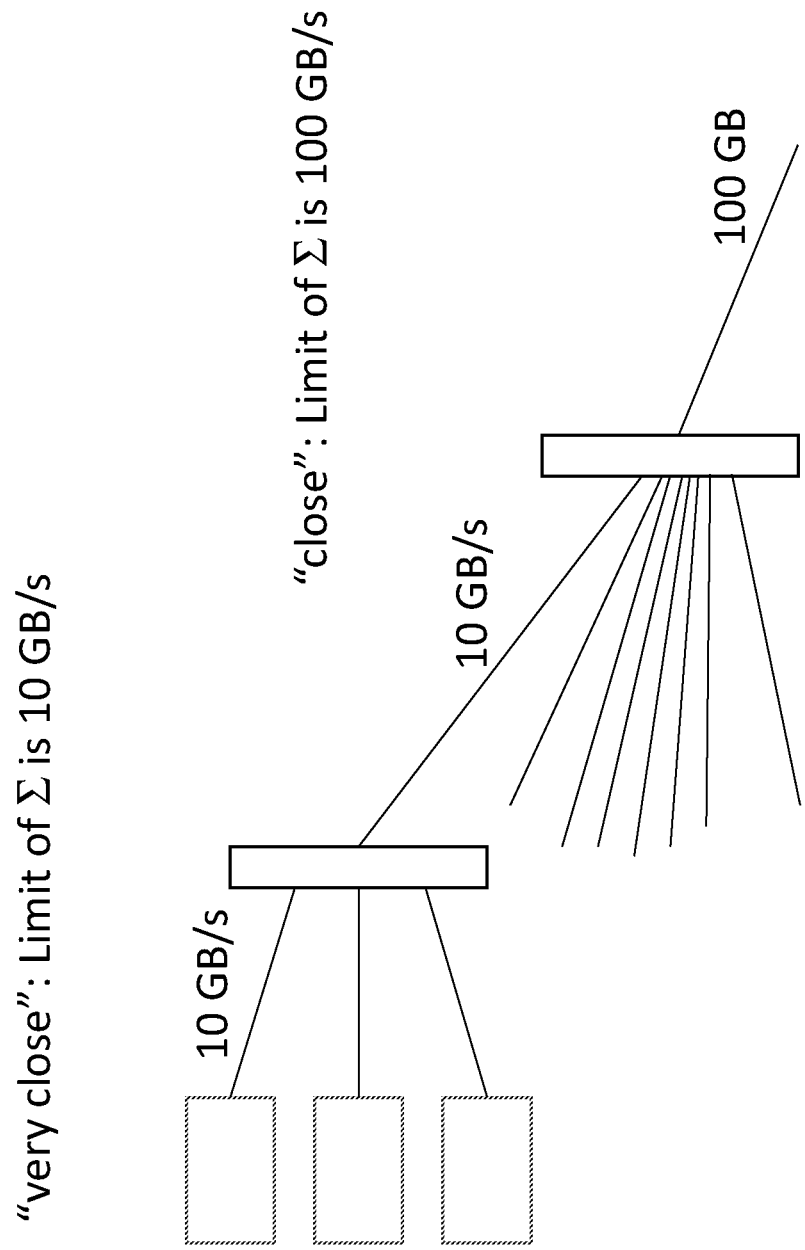
FIGS. 10-11 show details of a process flow for resource analysis according to a specific example involving a network topology environment.

FIG. 9 shows the activity of a resource modeling infrastructure (RMI) 900 to analyze constraints. In particular, the RMI defines for individual units, constraints of certain resource types or reading from physical machines. For example, here the RMI may indicate the limit of processing power (e.g., in operations per second) of a particular physical CPU, which is comprised of virtualized components (e.g., VMs, containers, etc.).

The constraint is read from the host with the ID: ID_host (==ID1_host==ID2_host). These constraints are the maximum value for the two processes with matching IDs, but there may be more processes using the same host and competing on the resource. These can be found, for example by searching the monitoring system for more processes reporting a host with the ID: ID_host.

In this manner, embodiments allow identifying if two processes run in the same VM, and the VM is constrained to have 2 CPU only, even if the processes would run in an application server instance and the application server in a container.

The RMI then sends these constraints to the RTA, together with the IDs. In this example these IDs indicate host, VM, container, application server instance, etc.

The RTA then proceeds to store the resource constraints together with IDs. The RTA finds matching IDs of units of processes, and reads the provided constraints. The RTA then finds the parent units of the units with the matching IDs, and reads the constraints from those parent units, thus providing a set of constraint of resource types for two processes.

According to certain embodiments, a procedure for constraint analysis utilizing coordinate location data may move from child-to-parent in order to identify bottlenecks. In alternative embodiments the procedure may move from parent-to-child through a resource hierarchy.

The specific embodiments described above are provided for purposes of illustration only, and embodiments are not limited to them. For example, while the above example has described constraints defined on different levels of CPU virtualization, embodiments are not limited to such environments.

For example, alternative embodiments may allow analysis of resource constraints defined on network topology. Consider a network topology shown in FIG. 10, with one switch serving three hosts, having a 10 GB/s line to the next switch serving a larger number of other switches and hosts, itself having a 100 GB/s line.

Considering a first level of the resource hierarchy of the network topology, hosts may each have nominal network bandwidth of 10 GB/s. Since the switch also has only 10 GB/s, the sum of the hosts can in total only be 10 GB/s.

However, a process on a host can experience lower bandwidth than the network card specification of 10 GB/s, as other processes on the same switch could consume bandwidth.

Considering a second level of the resource hierarchy of the network topology, even if the hosts attached to the same switch consume less than 10 GB/s bandwidth, a constraint on another switch can constrain the bandwidth available for a process. Thus even if the other hosts at the same switch do only consume 1 GB/s, a host may not get the remaining 9 GB/s, as the next switch may be loaded already with 99 GB/s and only has 100 GB/s capacity.

Figure 11:
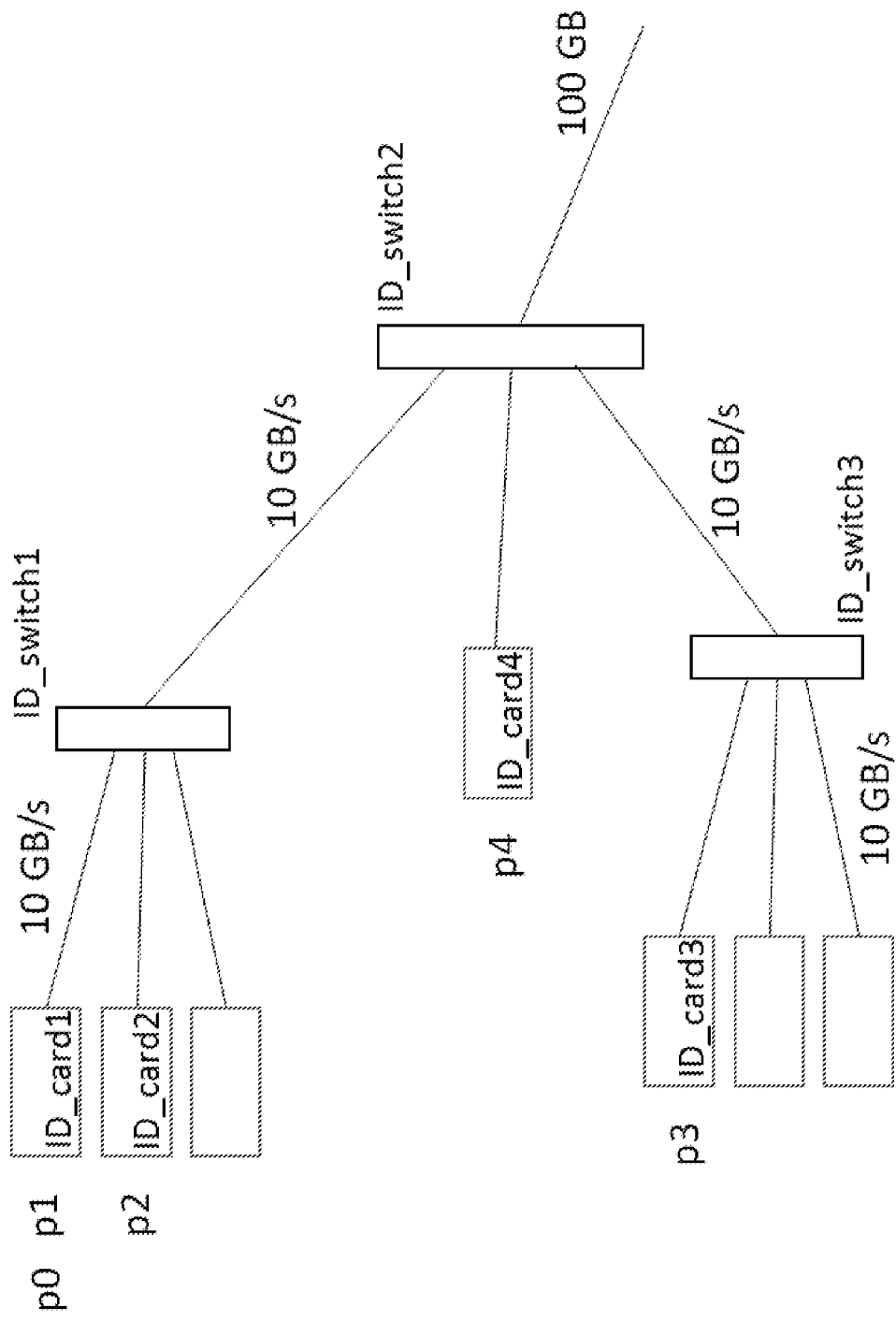

In this example, the topology of the network definition may be initially read by the scheduler component in order to define the resource coordinate system. Then, as shown in FIG. 11, an ID is defined for each unit in the network (network card, switch, switch . . . ):

Stack_process<x>(ID<x>_card, ID<y>_switch, ID<z>_switch).

With such a resource coordinate system in place determining locations of individualization resource units, the monitoring instance is then poised to provide insight into resource consumption. The centralized monitoring instance may work with a modeling infrastructure to determine proximity and constraints as has been described above.

It is further noted that embodiments are not limited to analysis of resource constraints that are due to virtualization and/or network topology. Other examples of constrained resources can include input-output (IO) devices (e.g., memory), which may perform at a given number of operations per second. For example, processes operating in different containers can use network mounted disk drives and thus share potentially the same storage capacity and IO.

In certain embodiments, the resource analysis may be implemented by a database engine, for example as present in an in-memory database. One example of such an in-memory database engine is that of the HANA in-memory database available from SAP SE of Walldorf, Germany.

According to particular embodiments, the processing power available to an in-memory database engine may be leveraged to perform one or more aspects as have been described herein. For example, the in-memory database engine may be employed to perform one or more of the functions described above: scheduling, reporting, topology analysis, and/or resource modeling to analyze constraints.

In summary, resource analysis according to embodiments may find use in analyzing a resource problem associated with one particular process. Such a single-process analysis could be conducted as follows.

A process p1 has problems with one resource (e.g. CPU).

Embodiments use the resource coordinate system to identify various individualization units of the CPU, and read the constraints for every layer.

The process loops over the resource layers, looking in a current layer for processes with competing resources.

If this is a layer with higher layers above (e.g., children), then sum iteratively the sum of all processes with the same ID on that layer. That is, this is a query on matching IDs of a certain type for all monitored processes.

If the sum of the resources matches the constraints, then a bottleneck has been found. If the sum of the resources does not match the constraints, then the analysis moves to the next layer (the parent) in order to identify the bottleneck.

Resource analysis according to embodiments may also find use in analyzing a resource problem that may be associated with multiple processes. That is, a multi-process resource analysis could be conducted to identify particular resource units that are the subject of competition between suspected processes. Such a multi-process analysis could be conducted as follows.

Identify if the multiple processes have matching IDs in the coordinate system of resource units (e.g. CPU or network bandwidth).

If the processes do not have matching coordinates (e.g., their ID stacks do not reflect common individualization resource units), then the processes do not compete and the root of the resource problem does not lie in competition between those processes.

If the suspect processes do have matching coordinates (e.g., share particular individualization resource unit IDs in their stacks), they are likely in competition for at least one individualization resource unit. A user may then carefully inspect the constraints for the individualization resource unit having that shared ID, and potentially analyze more processes to hone in upon the likely source of the resource problem.

Figure 12:
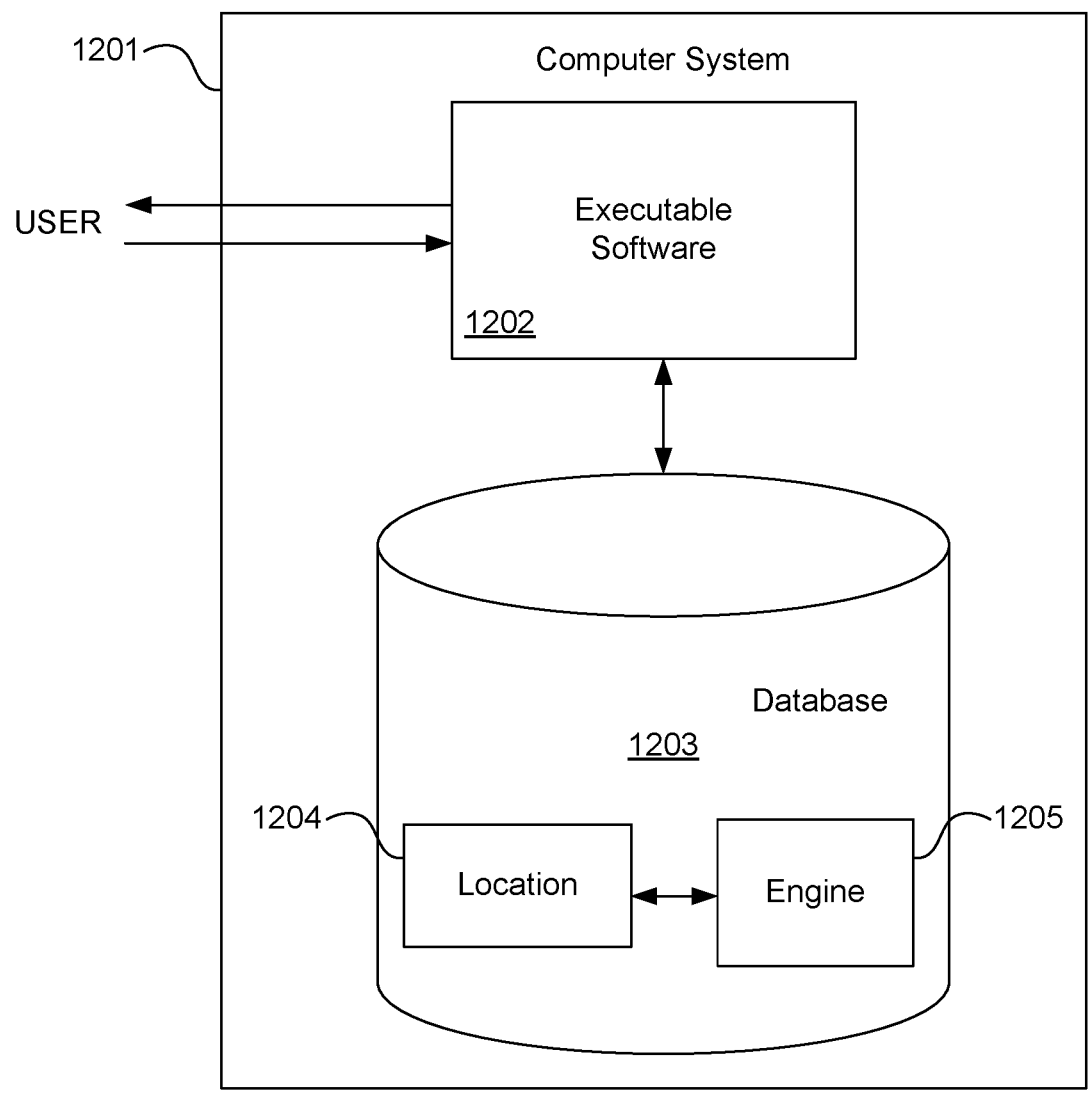
FIG. 12 illustrates hardware of a special purpose computing machine according to an embodiment that is configured to perform resource analysis.

FIG. 12 illustrates hardware of a special purpose computing machine configured to implement resource analysis according to an embodiment. In particular, computer system 1201 comprises a processor 1202 that is in electronic communication with a non-transitory computer-readable storage medium comprising a database 1203. This computer-readable storage medium has stored thereon code 1205 corresponding to an engine. Code 1204 corresponds to location information. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 13:
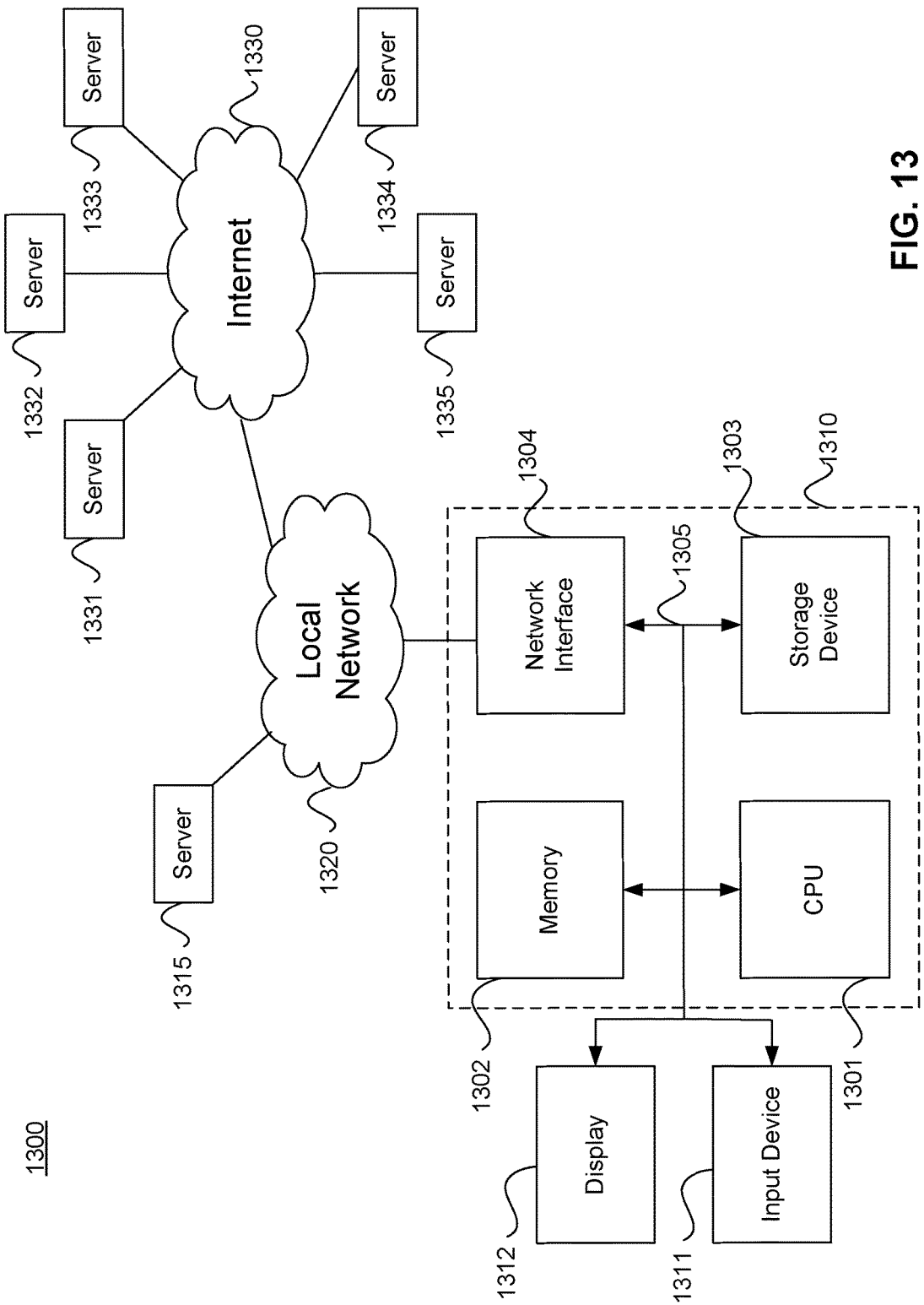
FIG. 13 illustrates an example computer system.

An example computer system 1300 is illustrated in FIG. 13. Computer system 1310 includes a bus 1305 or other communication mechanism for communicating information, and a processor 1301 coupled with bus 1305 for processing information. Computer system 1310 also includes a memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques above, for example. Storage device and memory are both examples of computer readable mediums.

Computer system 1310 may be coupled via bus 1305 to a display 1312, such as a cathode ray tube (CRT) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system. In some systems, bus 1305 may be divided into multiple specialized buses.

Computer system 1310 also includes a network interface 1304 coupled with bus 1305. Network interface 1304 may provide two-way data communication between computer system 13410 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 1310 can send and receive information, including messages or other interface actions, through the network interface 1304 across a local network 1320, an Intranet, or the Internet 1330. For a local network, computer system 1310 may communicate with a plurality of other computer machines, such as server 1315. Accordingly, computer system 1310 and server computer systems represented by server 1315 may form a cloud computing network, which may be programmed with processes described herein. In the Internet example, software components or services may reside on multiple different computer systems 1310 or servers 1331-1335 across the network. The processes described above may be implemented on one or more servers, for example. A server 1331 may transmit actions or messages from one component, through Internet 1330, local network 1320, and network interface 1304 to a component on computer system 1310. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   an in-memory database of an in-memory database assigning unique identifiers to each of a plurality of resources within a hierarchy of a computing environment to define location information;
   the in-memory database engine storing the location information in the in-memory database;
   the in-memory database engine determining from the location information, a first set of resources consumed by a first process based upon a first identifier stack comprising one or more of the unique identifiers;
   the in-memory database engine determining from the location information, a second set of resources consumed by a second process based upon a second identifier stack comprising one or more of the unique identifiers;
   the in-memory database engine comparing the first identifier stack with the second identifier stack to determine a proximity between the first process and the second process;
   the in-memory database engine communicating the proximity for display;
   the in-memory database engine receiving from a modeling infrastructure, a constraint of one resource of the first set of resources;
   the in-memory database engine storing the constraint in the in-memory database; and
   the the in-memory database revealing the one resource as a performance bottleneck of the first process based upon the constraint by,
      looping over layers of the first set of resources to look in a current layer for processes with competing resources,
      if the current layer is a layer with higher layers above, then sum iteratively processes with a same identifier on the current layer, and
      determine that the sum matches the constraint.

2. The method of claim 1 wherein:
   the computing environment comprises a virtualization computing environment; and
   the constraint comprises a number of virtual machines supported by a hardware central processing unit.

3. The method of claim 1 wherein:
   the computing environment comprises a network topology including a switch; and
   the constraint comprises a bandwidth of the switch.

4. The method of claim 1 wherein:
   the computing environment comprises a common resource shared between the first process and the second process; and
   the constraint comprises a number of operations per second of the common resource.

5. The method of claim 4 wherein the common resource comprises an input-output device.

6. The method of claim 5 wherein the common resource comprises a memory.

7. The method of claim 1 wherein:
   the computing environment comprises a virtualization computing environment; and
   the hierarchy comprises a virtual machine.

8. A non-transitory computer readable storage medium embodying a computer program for:
   an in-memory database engine of an in-memory database assigning unique identifiers to each of a plurality of resources within a hierarchy of a computing environment to define location information;
   the in-memory database engine storing the location information in the in-memory database;
   the in-memory database engine determining from the location information, a first set of resources consumed by a first process based upon a first identifier stack comprising one or more of the unique identifiers;
   the in-memory database engine determining from the location information, a second set of resources consumed by a second process based upon a second identifier stack comprising one or more of the unique identifiers;
   the in-memory database engine comparing the first identifier stack with the second identifier stack to determine a proximity between the first process and the second process;
   the in-memory database engine communicating the proximity for display;
   the in-memory database engine receiving from a modeling infrastructure, a constraint of one resource of the first set of resources;

the in-memory database engine storing the constraint in the in-memory database;

the in-memory database revealing the one resource as a performance bottleneck of the first process based upon the constraint by, looping over layers of the first set of resources to look in a current layer for processes with competing resources, if the current layer is a layer with higher layers above, then sum iteratively processes with a same identifier on the current layer, and determine that the sum matches the constraint.

9. The non-transitory computer readable storage medium of claim 8 wherein:

the computing environment comprises a virtualization computing environment; and the hierarchy comprises a virtual machine.

10. A computer program product embodied on a non-transitory computer readable storage medium and comprising:

one or more processors;

a software program, executable on said computer program product, the software program configured to cause an in-memory database engine to:

assign unique identifiers to each of a plurality of resources within a hierarchy of a computing environment to define location information;

store the location information in an in-memory database;

determine from the location information, a first set of resources consumed by a first process based upon a first identifier stack comprising one or more of the unique identifiers;

determining from the location information, a second set of resources consumed by a second process based upon a second identifier stack comprising one or more of the unique identifiers;

compare the first identifier stack with the second identifier stack to determine a proximity between the first process and the second process;

communicate the proximity for display;

receive a constraint of one resource of the first set of resources;

store the constraint in the in-memory database; and reveal the one resource as a performance bottleneck based upon the constraint by looping over layers of the first set of resources to look in a current layer for processes with competing resources, if the current layer is a layer with higher layers above, then sum iteratively processes with a same identifier on the current layer, and determine that the sum matches the constraint.

11. The computer program product of claim 10 wherein:

the computing environment comprises a virtualization computing environment; and the hierarchy comprises a virtual machine.

12. The computer program product of claim 10 wherein:

the computing environment comprises a network topology including a switch; and the constraint comprises a bandwidth of the switch.

13. The computer program product of claim 10 wherein the constraint comprises a number of operations per second of the one resource.

\* \* \* \* \*